(12) United States Patent
Liu et al.

(10) Patent No.: US 11,411,216 B2
(45) Date of Patent: Aug. 9, 2022

(54) ELECTRODE SLURRY, SLURRY ELECTRODE, FLOW BATTERY AND STACK

(71) Applicants: China Energy Investment Corporation Limited, Beijing (CN); National Institute of Clean-and-Low-Carbon Energy, Beijing (CN)

(72) Inventors: Qinghua Liu, Beijing (CN); John P. Lemmon, Beijing (CN); Chang Wei, Beijing (CN); Wenqiang Xu, Beijing (CN); Yonglong Li, Beijing (CN); Wenbin Liang, Beijing (CN)

(73) Assignees: China Energy Investment Corporation Limited, Beijing (CN); National Institute of Clean-and-Low-Carbon Energy, Beijing (CN)

( * ) Notice: Subject to any disclaimer, the term of this patent is extended or adjusted under 35 U.S.C. 154(b) by 163 days.

(21) Appl. No.: 16/196,347

(22) Filed: Nov. 20, 2018

(65) Prior Publication Data

US 2019/0252677 A1    Aug. 15, 2019

(30) Foreign Application Priority Data

Feb. 9, 2018    (CN) .......................... 201810136823.5

(51) Int. Cl.
*H01M 4/36* (2006.01)
*H01M 8/18* (2006.01)
(Continued)

(52) U.S. Cl.
CPC ........... *H01M 4/368* (2013.01); *H01M 4/582* (2013.01); *H01M 8/188* (2013.01);
(Continued)

(58) Field of Classification Search
CPC ..... H01M 4/36–368; H01M 4/58–582; H01M 8/188
See application file for complete search history.

(56) References Cited

U.S. PATENT DOCUMENTS 4,786,567 A    11/1988    Skyllas-Kazacos et al.
4,814,241 A *   3/1989    Nagashima ........... H01M 8/188
                                                  429/199
(Continued)

FOREIGN PATENT DOCUMENTS

CN    101009376 A    8/2007
CN    102263280 A    11/2011
(Continued)

OTHER PUBLICATIONS

Lin, M. et al."An Ultrafast Rechargeable Aluminium-Ion Battery" (2015) Nature 520: 324-328.

*Primary Examiner* — Karie O'Neill Apicella
(74) *Attorney, Agent, or Firm* — Calfee Halter & Griswold LLP

(57) ABSTRACT

A flow battery field, an electrode slurry, a slurry electrode, a flow battery, and a stack are disclosed. The electrode slurry comprising electrode particles and electrolyte that contains active substance. Based on 100 pbw active substance, the electrode particles are 10-1,000 pbw. The slurry electrode comprises: a bipolar plate, a current collector, and a slurry electrode reservoir configured to store electrode slurry. In the two opposite sides of the bipolar plate, one side is adjacent to the current collector, and the other side is arranged with a slurry electrode cavity, and flow channels are arranged and extended between the bipolar plate and the slurry electrode cavity, so that the electrode slurry is circulated between the slurry electrode cavity and the slurry electrode reservoir. A flow battery that employs the electrode (Continued)

slurry can provide higher and more stable power output under the same current condition and is lower in cost.

15 Claims, 6 Drawing Sheets

(51) Int. Cl.
*H01M 4/58* (2010.01)
*H01M 4/02* (2006.01)

(52) U.S. Cl.
CPC ............... *H01M 2004/029* (2013.01); *H01M 2300/0002* (2013.01); *H01M 2300/0011* (2013.01)

(56) References Cited

U.S. PATENT DOCUMENTS

| | | | |
|---|---|---|---|
| 6,194,095 | B1 | 2/2001 | Hockaday |
| 2010/0021805 | A1* | 1/2010 | Winter ............... H01M 12/085 429/101 |
| 2012/0135278 | A1* | 5/2012 | Yoshie ................... H01M 8/20 429/7 |
| 2014/0255821 | A1 | 9/2014 | Katayama et al. |
| 2014/0370404 | A1 | 12/2014 | Kato et al. |
| 2015/0125764 | A1 | 5/2015 | Smith et al. |
| 2016/0254551 | A1 | 9/2016 | Nakaishi |
| 2017/0346123 | A1* | 11/2017 | Loretz ..................... H01M 4/96 |
| 2018/0277858 | A1 | 9/2018 | Fujita et al. |

FOREIGN PATENT DOCUMENTS

| | | |
|---|---|---|
| CN | 102332596 A | 1/2012 |
| CN | 103247816 A | 8/2013 |
| CN | 103647091 A | 3/2014 |
| CN | 103947024 A | 7/2014 |
| CN | 104040775 A | 9/2014 |
| CN | 105659422 A | 6/2016 |
| WO | 2014202320 A1 | 12/2014 |
| WO | 2017208570 A1 | 12/2017 |

* cited by examiner

ELECTRODE SLURRY, SLURRY ELECTRODE, FLOW BATTERY AND STACK

CROSS REFERENCE TO RELATED APPLICATION(S)

This application claims priority to Chinese Application No. 201810136823.5, which was filed on Feb. 9, 2018, was entitled "Electrode Slurry, Slurry Electrode, Flow Battery and Stack", and is incorporated herein by reference as if fully set forth.

FIELD OF INVENTION

The present invention relates to the flow battery field, in particular to an electrode slurry, a slurry electrode, a flow battery, and a stack.

BACKGROUND

Flow battery belongs to an electrochemical energy storage technique that is suitable for large-scale energy storage, and usually utilize the valence change of active substances in the liquid phase at the positive electrode and the negative electrodes in a charge-discharge process to store/release energy. At present, flow battery systems that have become matured include all-vanadium redox flow batteries, Fe—Cr flow batteries, and Zn—Br flow batteries. A flow battery has separate energy unit and power unit. The energy unit usually refers to the positive electrode electrolyte and negative electrode electrolyte of the battery, and the upper limit of energy of a flow battery depends on the concentration and volume of the active substance in the electrolyte; the power unit usually refers to a single cell or a stack, the electrolyte flows through the electrodes in the single cell or the stack, and the active substance reacts on the internal or external surfaces of the electrodes and thereby converts chemical energy into electric energy or converts electric energy into chemical energy.

Flow battery usually employs flow-through electrodes, the electrode material consists of porous carbon material, graphite, or metal material, the electrolyte that contains active substance is transported through a pipeline to the inlet of the electrode and flows to the internal surface of the electrode, and electrochemical reaction happens at the interface between the internal surface of the electrode and the electrolyte, accompanied by valence change of the active substance and electron gain or loss, so that electric energy is stored or released. The magnitude of the current in a flow battery depends on the surface area of the electrodes, functional groups, conductivity, etc.; besides, the pore structures on the surfaces of the electrodes have influence on the transfer of the active substance. Increasing the surface area of the electrodes is helpful for improving the ability of the flow battery to generate bigger current, but results in smaller pore diameter of the electrodes and consequently limits the transfer of the active substance. As a result, the flow battery can not be operated under a higher current condition, and encounters a bottleneck in performance improvement.

Meng-Chan Li et al. (Nature, 520 (2015)325) reported a rechargeable Al-ion cell with high-power characteristic. The negative electrode reaction of the cell is aluminum deposition and dissolution reaction and the positive electrode reaction is aluminium tetrachloride negative ion (四氯化铝负离子) intercalation or de-intercalation reaction. The electrolyte uses non-inflammable ion liquid. The discharge plateau of the cell is 2 V, the capacity of the cell is 70 mAh $g^{-1}$, and the current efficiency is around 98%. The cell shows good stability. However, unfortunately, the capacity of the cell is still as low as that of regular non-flow batteries, and the cell doesn't have capacity-power decoupled function, and is difficult to use for large-scale energy storage.

All-vanadium redox flow battery is a kind of flow battery that have been studied for many years and developed deeply, and have a good prospect of commercialization. It utilizes the valence change of vanadium ions dissolved in aqueous solution to realize energy storage and release. The earliest patent report is a US patent named "All-Vanadium Redox Battery" (U.S. Pat. No. 4,786,567) in 1988. The battery disclosed in the patent is nonflammable and has no risk of catching fire or explosion, because it employs aqueous solution. In addition, the electrode reaction area and the active substance storage area are separated from each other and thereby power and capacity structures are formed, and the output power and capacity can be designed separately as required. Moreover, the battery has advantages, including long life time and recyclable materials etc. However, the open circuit voltage and output power of the battery are relatively low. In addition, as the reserve of vanadium element is relatively limited, the cost of raw material is high, and the energy storage cost is also high. Consequently, the commercial application of the battery is a big challenge.

A flow-type ion cell has been disclosed in the patent application document No. US20150125764A1. The objective of that invention is to enable the flow battery to integrate the advantages of high voltage and high power of Li-ion cells with the power-capacity decoupled feature from flow batteries, so that the flow battery is applicable to both electric automobile field and large-scale energy storage fields, such as energy storage for the grid connection of wind power (风电并网), etc. However, since the flow battery disclosed in the patent application is born out of Li-ion cells, a SEI passivation film has to be formed in the initial charging stage. But, under a flowing condition, the film can't be formed continuously. Consequently, it is difficult for the subsequent reaction to happen. Therefore, it is still limited to the basic theoretical study in this area.

Thus, apparently there is a highly need for a flow battery that has low-cost with good electrochemical performance.

SUMMARY

To overcome the drawbacks in the prior art, i.e., the existing flow batteries involve a high cost, have low cell capacity, and are difficult to apply at a large-scale, the present invention provides an electrode slurry, a slurry electrode, a flow battery, and a stack. A flow battery that employs the electrode slurry provided in the present invention can provide higher and more stable power output under the same current condition, and is lower in cost.

To attain the object described above, in one aspect, the present invention provides an electrode slurry, which contains: electrode particles and electrolyte that contains active substance, wherein, based on 100 pbw active substance, the electrode particles are 10-1,000 pbw.

Preferably, the active substance is selected from at least one of metal halides.

In the second aspect, the present invention provides a slurry electrode, which comprises: a bipolar plate, a current collector, and a slurry electrode reservoir configured to store electrode slurry; in the two opposite sides of the bipolar plate, one side is adjacent to the current collector, and the other side is arranged with a slurry electrode cavity that is open on one side, and the open side of the slurry electrode cavity is covered with an ion exchange membrane; an electrode slurry inlet flow channel and an electrode slurry outlet flow channel are arranged and extended between the bipolar plate and the slurry electrode cavity, the electrode slurry inlet flow channel is connected with an outlet of the slurry electrode reservoir, and the electrode slurry outlet flow channel is connected with an inlet of the slurry electrode reservoir, so that the electrode slurry is circulated between the slurry electrode cavity and the slurry electrode reservoir; and the electrode slurry is the electrode slurry provided in the present invention.

In a third aspect, the present invention provides a flow battery, which comprises: a slurry electrode, an opposite electrode, and a membrane put between the slurry electrode and the opposite electrode, wherein, the slurry electrode is the slurry electrode provided in the present invention.

In a fourth aspect, the present invention provides a stack, which comprises the flow battery described above.

The electrode slurry provided in the present invention contains electrode particles and electrolyte that contains active substance, and the active substance can have intercalation and de-intercalation reactions inside the electrode particles. A flow battery that employs the electrode slurry provided in the present invention can provide higher power output under the same current condition.

Preferably, in a case that the active substance is selected from at least one of metal halides, the raw material cost of the flow battery can be effectively reduced; in addition, compared with conventional flow batteries that employ expensive carbon fibers, the electrode slurry in the flow battery uses granular electrode material, and the material preparation process is simpler. The electrode slurry provided in the present invention has lower material cost and lower synthesis cost, and thereby reduces the production cost of the flow batteries.

In existing flow batteries, the electrolyte that contains active substance is transported through a pipeline to the inlet of the electrode, and flows to the internal surface of the electrode, and electrochemical reaction happens at the interface between the internal surface of the electrode and the electrolyte. The magnitude of the current in the flow battery depends on the surface area of the electrodes; besides, the pore structures on the surface of the electrode have influence on the transfer of the active substance. Increasing the surface area of the electrodes is helpful for improving the ability of the flow battery to generate bigger current, but causes decreased pore diameter of the electrodes and consequently limits the transfer of the active substance. As a result, the flow battery can't be operated under a higher current condition, and encounters a bottleneck in performance improvement. The slurry electrode provided in the present invention overcomes the bottleneck. Compared with existing stationary porous electrodes, the electrode slurry is stored in an external slurry electrode reservoir, the active substance has intercalation and de-intercalation reactions inside the electrode particles, and thereby the interface between the electrode and the electrolyte is greatly increased, the electrode reactions are promoted, the upper current limit is improved, and more current can be produced in limited space; moreover, the electrodes in a slurry form have better mass transfer characteristic and higher limiting current density.

The flow battery provided in the present invention comprises the above-mentioned slurry electrode, which has not particular requirement for the opposite electrode. The opposite electrode may be consist of porous solid electrode; electrochemical reaction happens when the electrolyte stored out of the cell is flowed across the internal surface and outside surface of the electrode. The flow battery provided in the present invention has lower production cost, more stable power output, and higher specific discharge capacity.

BRIEF DESCRIPTION OF THE DRAWING(S)

Figure 1:
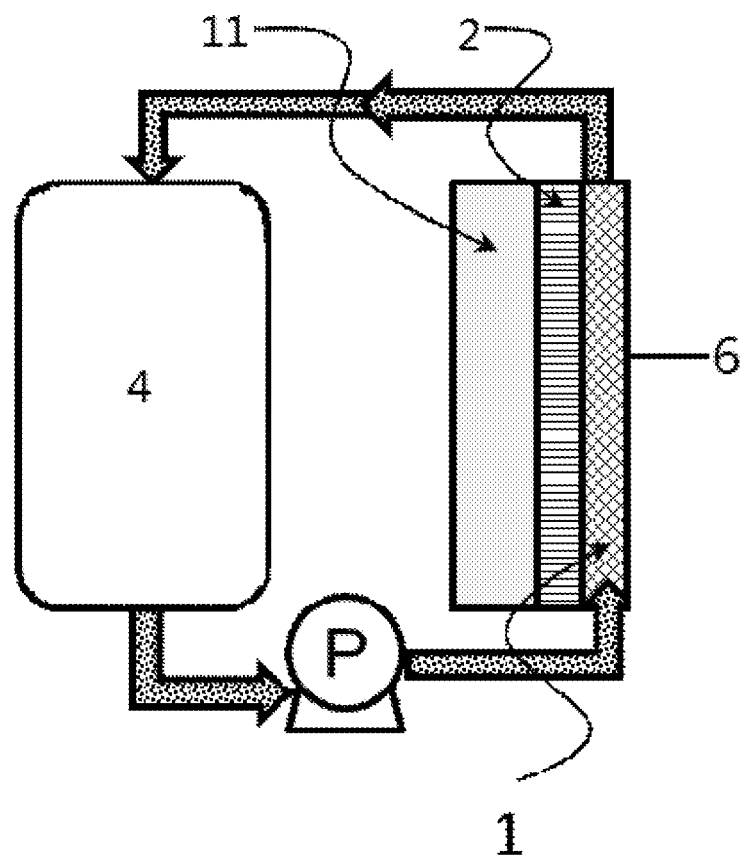
FIG. 1 is a schematic diagram of the slurry electrode in Example 1.

| Description of the Symbols of the Drawings |
| --- |
| 1-bipolar plate |
| 2-current collector |
| 4-slurry electrode reservoir |
| 5-slurry electrode cavity |
| 6-ion exchange membrane |
| 7-electrode slurry inlet flow channel |
| 8-electrode slurry outlet |
| 9-fluid channel |
| 10-baffle plate (折流板) flow channel |
| 21-porous electrode |
| 22-opposite bipolar plate |
| 23-opposite current collector |
| 24-electrolyte reservoir |
| 3-membrane |
| 11-end plate |
| 2'-stack current collector |

DETAILED DESCRIPTION OF THE PREFERRED EMBODIMENT(S)

Hereunder some embodiments of the present invention will be detailed with reference to the accompanying drawings. It should be understood that the embodiments described here are only provided to describe and explain the present invention, but shall not be deemed as constituting any limitation to the present invention.

The present invention provides an electrode slurry, comprising electrode particles and electrolyte that contains active substance, wherein, based on 100 pbw active substance, the electrode particles are 10-1,000 pbw.

According to a preferred embodiment of the present invention, based on 100 pbw active substance, the electrode particles are 50-800 pbw, further preferably are 200-500 pbw.

According to the present invention, the active substance can be any conventional active substances in the art. Preferably, the active substance is selected from at least one of metal halides. Utilizing metal halide as the active substance not only can further improve the specific discharge capacity of the cell, but also can effectively reduce the raw material cost of the flow battery, because such active substances are widely available and low in price.

In the present invention, the metal halides may be metal chlorides and metal bromides, and the metal may be at least one of aluminum, ferrum, chromium, titanium, copper, nickel, cobalt, and zinc. Preferably, the active substance is at least one of aluminum chloride, aluminum bromide, ferric chloride, ferrous chloride, ferric bromide, chromium chloride, titanium chloride, cupric chloride, nickel chloride, cobaltous chloride, and zinc chloride, further preferably is aluminum chloride and/or ferric chloride.

In the electrode slurry according to the present invention, preferably, the concentration of the active substance in the electrolyte is 0.1-15 mol/L, further preferably is 1-10 mol/L, and optimally is 1-5 mol/L.

According to an embodiment of the present invention, the electrolyte further contains solvent. The solvent may be water or any conventional organic solvent in the art. Preferably, the solvent is at least one of water, methanol, ethanol, ether, acetone, and acetic acid, further preferably, the solvent is water.

According to the electrode slurry in the present invention, preferably, the electrolyte further contains supporting electrolyte. The supporting electrolyte can be any conventional supporting electrolytes that can improve the conductivity of the solution in the flow battery in the art, and it doesn't participate in any electrochemical reaction. Preferably, the supporting electrolyte is at least one of ethylene carbonate, propylene carbonate, diethyl carbonate, dimethyl carbonate, ethyl methyl carbonate, lithium hexafluorophosphate, sulfuric acid, hydrochloric acid, nitric acid, sodium chloride, potassium chloride, sodium sulfate, potassium sulfate, sodium hydroxide, and potassium hydroxide, further preferably is at least one of sulfuric acid, hydrochloric acid, nitric acid, sodium chloride, potassium chloride, sodium sulfate, potassium sulfate, sodium hydroxide, and potassium hydroxide, still further preferably is sulfuric acid and/or sodium chloride.

According to a preferred embodiment of the present invention, the concentration of the supporting electrolyte is 0.1-10 mol/L, further preferably is 2-5 mol/L.

According to the electrode slurry provided in the present invention, the electrolyte may further contain other additives that can improve the electrochemical performance of the cells, such as conductive additive and surfactant. Preferably, the electrolyte further contains conductive additive and/or surfactant. The conductive additive and surfactant can be any conventional conductive additives and surfactants commonly used in electrolytes in the art.

According to the present invention, preferably, the electrode particles are at least one of graphite, carbon powder, silicon, and molybdenum disulfide, and further preferably is graphite. The graphite may be natural graphite or artificial graphite, and there is no particular restriction on it in the present invention.

According to a preferred embodiment of the present invention, the average particle diameter of the electrode particles is 0.01-200 μm, further preferably is 1-100 μm, and optimally is 50-100 μm. With that preferred embodiment, the electrode slurry has a better mobility, and has higher conductivity and can provide higher current output. In the present invention, the average particle diameter may be measured with a Mastersizer 3000 device, and is D50 value.

There is no particular restriction on the shape of the electrode particles in the present invention. The electrode particles may be in a regular shape or irregular shape, such as spherical, cubic, or irregular 3D shape.

Figure 2:
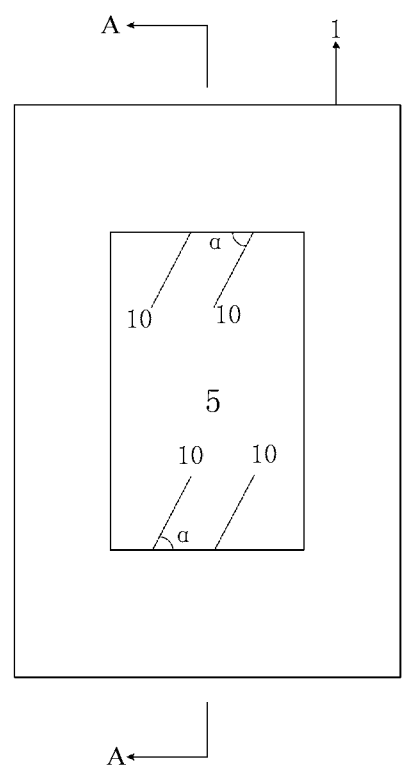
FIGS. 2 and 3 are schematic diagrams of the bipolar plate and slurry electrode cavity of the slurry electrode in Example 1.
Figure 3:
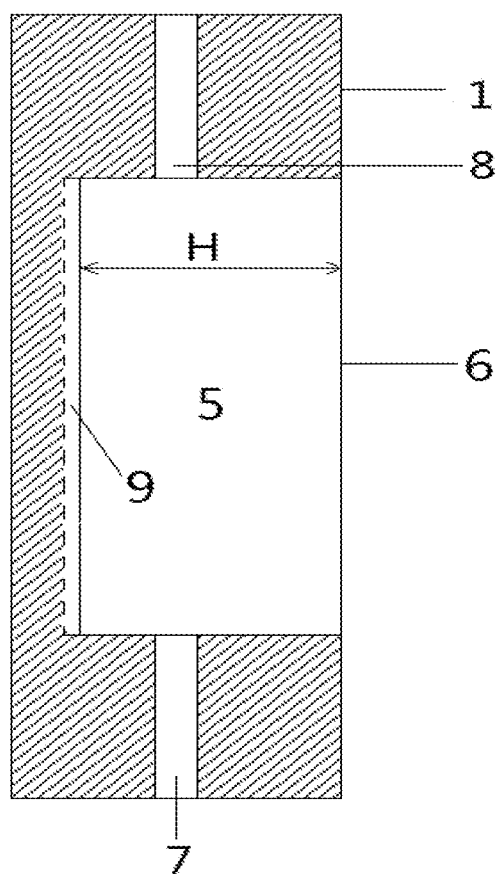

The present invention further provides a slurry electrode. As shown in FIGS. 1, 2 and 3, the slurry electrode comprises:

A bipolar plate 1, a current collector 2, and a slurry electrode reservoir 4 configured to store electrode slurry;

In the two opposite sides of the bipolar plate 1, one side is adjacent to the current collector 2, and the other side is arranged with a slurry electrode cavity 5 that is open on one side, and the open side of the slurry electrode cavity 5 is covered with an ion exchange membrane 6;

An electrode slurry inlet flow channel 7 and an electrode slurry outlet flow channel 8 are arranged and extended between the bipolar plate 1 and the slurry electrode cavity 5, the electrode slurry inlet flow channel 7 is connected with an outlet of the slurry electrode reservoir 4, and the electrode slurry outlet flow channel 8 is connected with an inlet of the slurry electrode reservoir 4, so that the electrode slurry is circulated between the slurry electrode cavity 5 and the slurry electrode reservoir 4; the electrode slurry is the electrode slurry described above.

The electrodes in most flow batteries in the prior art are stationary porous electrodes, and the electrolyte is transferred to the internal surface and outside surface of the porous electrode and electrochemical reaction happens there. In contrast, in the present invention, electrode particles and electrolyte are formed electrode slurry, the electrode slurry is stored in a slurry electrode reservoir 4, and an electrode slurry inlet flow channel 7 and an electrode slurry outlet flow channel 8 are arranged and extended between the bipolar plate 1 and the slurry electrode cavity 5, so that the electrode slurry can be circulated between the slurry electrode cavity 5 and the slurry electrode reservoir 4, and the active substance has intercalation and de-intercalation reactions inside the electrode particles.

According to the present invention, the bipolar plate 1 can be any conventional bipolar plates in the art, and can be made of any conductive materials. For example, the bipolar plate materials can be graphite materials, graphite/high polymer composite materials, or conductive carbon materials.

As shown in FIGS. 2 and 3, the slurry electrode cavity 5 is a front slot machined inside the bipolar plate 1. The slurry electrode cavity 5 can be in a regular or irregular 3D shape, and there is no particular restriction on the shape in the present invention. However, the maximum length, maximum width, and maximum thickness of the slurry electrode cavity 5 are smaller than the length, width, and thickness of the bipolar plate 1. Preferably, the slurry electrode cavity 5 is a regular cubic structure. Such a structure is not only easy to process but also helpful for the transport of the electrode slurry.

According to the present invention, the cross section of the slurry electrode cavity 5 may be a rectangle, square, or any other irregular polygon. In the present invention, the cross-section area of the slurry electrode cavity 5 may be selected within a wide range, and may be selected by those skilled in the art according to the specific application conditions. Preferably, the cross-section area of the slurry electrode cavity 5 is 10 mm$^2$-1 m$^2$, preferably is 0.01 m$^2$-0.1 m$^2$. In a case that the slurry electrode cavity 5 is in an irregular shape, the cross-section area of the slurry electrode cavity 5 refers to the maximum cross-section area of the slurry electrode cavity 5.

According to a preferred embodiment of the present invention, the depth H of the slurry electrode cavity 5 is 0.1-10 mm, further preferably is 0.5-5 mm. In a case that the slurry electrode cavity 5 is a regular cubic structure, the depth of the slurry electrode cavity 5 refers to the thickness of the slurry electrode cavity 5 (as shown in FIG. 3); in a case that the slurry electrode cavity 5 is an irregular 3D shape, the depth of the slurry electrode cavity 5 refers to the maximum thickness of the slurry electrode cavity 5 in the horizontal direction.

According to a preferred embodiment of the present invention, the volume of the slurry electrode cavity 5 is 5-90% of the volume of the bipolar plate 1, preferably is 10-50% of the volume of the bipolar plate 1, and optimally is 15-25% of the volume of the bipolar plate 1.

To further facilitate the electrode slurry to flow and disperse uniformly, preferably, the slurry electrode cavity 5 is arranged with fluid channel 9, which may be serpentine-shaped flow channel, interdigitated (插指形) flow channel, or parallel flow channel. The fluid channel 9 may be a groove machined in the bipolar plate 1. Further preferably, the depth of the fluid channel 9 may be 0.05-8 mm, preferably is 0.2-3 mm; the width of the fluid channel 9 may be 0.1-10 mm, preferably is 0.5-5 mm.

To further facilitate the electrode slurry to flow and disperse uniformly, preferably, as shown in FIG. 2, the slurry electrode cavity 5 is arranged with one, two or more baffle plates 10; further preferably, said two or more baffle plates 10 are spaced from each other.

According to an embodiment of the present invention, the baffle plates 10 are disposed inside the slurry electrode cavity 5; two or more baffle plates 10 may be arranged in a parallel or intersecting manner; or some baffle plates 10 may be arranged in a parallel manner, while the other baffle plates 10 are arranged in an intersecting manner. There is no particular restriction on the arrangement in the present invention, as long as the arrangement can attain a baffling effect.

According to a preferred embodiment of the present invention, as shown in FIG. 2, the angle α between the baffle plate 10 and the surface of the slurry electrode cavity 5 in contact with the baffle plate 10 is 0°-90°, preferably is 30°-60°. The cross sectional area of the baffle plate 10 may be 1-3 mm$^2$, and the length of the baffle plate 10 may be 10-30 mm.

According to the present invention, an electrode slurry inlet flow channel 7 and an electrode slurry outlet flow channel 8 are arranged and extended between the bipolar plate 1 and the slurry electrode cavity 5, which means that the electrode slurry inlet flow channel 7 and the electrode slurry outlet flow channel 8 are arranged and extended between the top end face of the bipolar plate 1 and the top end face of the slurry electrode cavity 5 and between the bottom end face of the bipolar plate 1 and the bottom end face of the slurry electrode cavity 5 respectively, or the electrode slurry outlet flow channel 8 and the electrode slurry inlet flow channel 7 are arranged and extended between the top end face of the bipolar plate 1 and the top end face of the slurry electrode cavity 5 and between the bottom end face of the bipolar plate 1 and the bottom end face of the slurry electrode cavity 5 respectively. The electrode slurry inlet flow channel 7 and the electrode slurry outlet flow channel 8 are arranged to ensure that the electrode slurry is circulated between the slurry electrode cavity 5 and the slurry electrode reservoir 4.

According to an embodiment of the present invention, the electrode slurry inlet flow channel 7 is connected with the outlet of the slurry electrode reservoir 4 through a pipeline, and a pump is provided in the pipeline.

In the present invention, one end of the electrode slurry inlet flow channel 7 and one end of the electrode slurry outlet flow channel 8 may be connected with the slurry electrode cavity 5, and the other end of the electrode slurry inlet flow channel 7 and the other end of the electrode slurry outlet flow channel 8 may be on outer end faces of the slurry electrode cavity 5, as long as the electrode slurry can be circulated smoothly. There is no particular restriction on the arrangement of the electrode slurry inlet flow channel 7 and the electrode slurry outlet flow channel 8.

There is no particular restriction on the shape of the electrode slurry inlet flow channel 7 and the shape of the electrode slurry outlet flow channel 8 in the present invention, as long as the electrode slurry can be circulated smoothly. The cross section of the electrode slurry inlet flow channel 7 and the cross section of the electrode slurry outlet flow channel 8 can be a circle, ellipse, regular polygon or irregular polygon respectively and independently. Preferably, both the cross section of the electrode slurry inlet flow channel 7 and the cross section of the electrode slurry outlet flow channel 8 are circles. With that preferred embodiment, the electrode slurry inlet flow channel 7 and the electrode slurry outlet flow channel 8 nearly have no dead corner, and are more advantageous for the transport of the electrode slurry.

According to a preferred embodiment of the present invention, the angle between the extension direction of the electrode slurry inlet flow channel 7 and the horizontal direction is 0°-90°, further preferably is 45°-90°.

According to a preferred embodiment of the present invention, the angle between the extension direction of the electrode slurry outlet flow channel 8 and the horizontal direction is 0°-90°, further preferably is 45°-90°.

With the preferred arrangement of the electrode slurry inlet flow channel 7 and electrode slurry outlet flow channel 8, the slurry can be distributed more uniformly in the cavity, and thereby uniform current and voltage distribution can be obtained.

Though an detailed example of 90° angle between the extension direction of the electrode slurry inlet flow channel 7/electrode slurry outlet flow channel 8 and the horizontal direction is shown in FIG. 3 in the present invention, it should be understood by those skilled in the art on the basis of the above description: the electrode slurry inlet flow channel 7 and the electrode slurry outlet flow channel 8 may be deflected forward, backward, leftward or rightward in the bipolar plate on the basis of the arrangement in FIG. 3.

According to the present invention, the vertical extension direction of the electrode slurry inlet flow channel 7 may be superposed with or parallel to the vertical extension direction of the electrode slurry outlet flow channel 8 (i.e., the electrode slurry inlet flow channel 7 and the electrode slurry outlet flow channel 8 are in the same vertical direction, as shown in FIG. 3). There is no special requirement for that arrangement in the present invention.

The open side of the slurry electrode cavity 5 is covered with an ion exchange membrane 6, so that, when the slurry electrode is assembled in a cell, the bridge ions between the positive electrode and the negative electrode of the cell can pass through the ion exchange membrane 6. The bridge ions include, but are not limited to Na$^+$, K$^+$, Li$^+$ and OH$^-$. According to a preferred embodiment of the present invention, the ion exchange membrane 6 is at least one of cation exchange membrane, anion exchange membrane, and sieving membrane; further preferably, the ion exchange membrane 6 can be made of at least one of sulfonic acid membrane material, high-polymer porous membrane material, organic/inorganic composite material, and inorganic membrane material. The ion exchange membrane is commercially available.

The present invention further provides a flow battery, which comprises: a slurry electrode, an opposite electrode, and a membrane 3 put between the slurry electrode and the opposite electrode, wherein, the slurry electrode is the slurry electrode described above.

In the present invention, the slurry electrode may be used as a positive electrode or negative electrode. Those skilled in the art should understand: when the slurry electrode is used as a positive electrode, the opposite electrode is naturally used as a negative electrode; when the slurry electrode is used as a negative electrode, the opposite electrode is naturally used as a positive electrode.

A flow battery assembled from the slurry electrode provided in the present invention has higher open circuit voltage than conventional flow batteries, and can provide higher power output under the same current condition. Besides, compared with conventional flow batteries, which employ expensive carbon fibers, the flow battery provided in the present invention may employ granular electrode material (e.g., graphite) for at least one of the electrodes. Hence, the electrode material preparation process is simpler, and the synthesis cost is lower.

There is no particular restriction on the opposite electrode in the present invention, as long as the opposite electrode can work with the slurry electrode and the membrane 3 cooperatively. According to an embodiment of the present invention, the opposite electrode is an electrode provided in the prior art, including stationary porous electrode.

Figure 4:
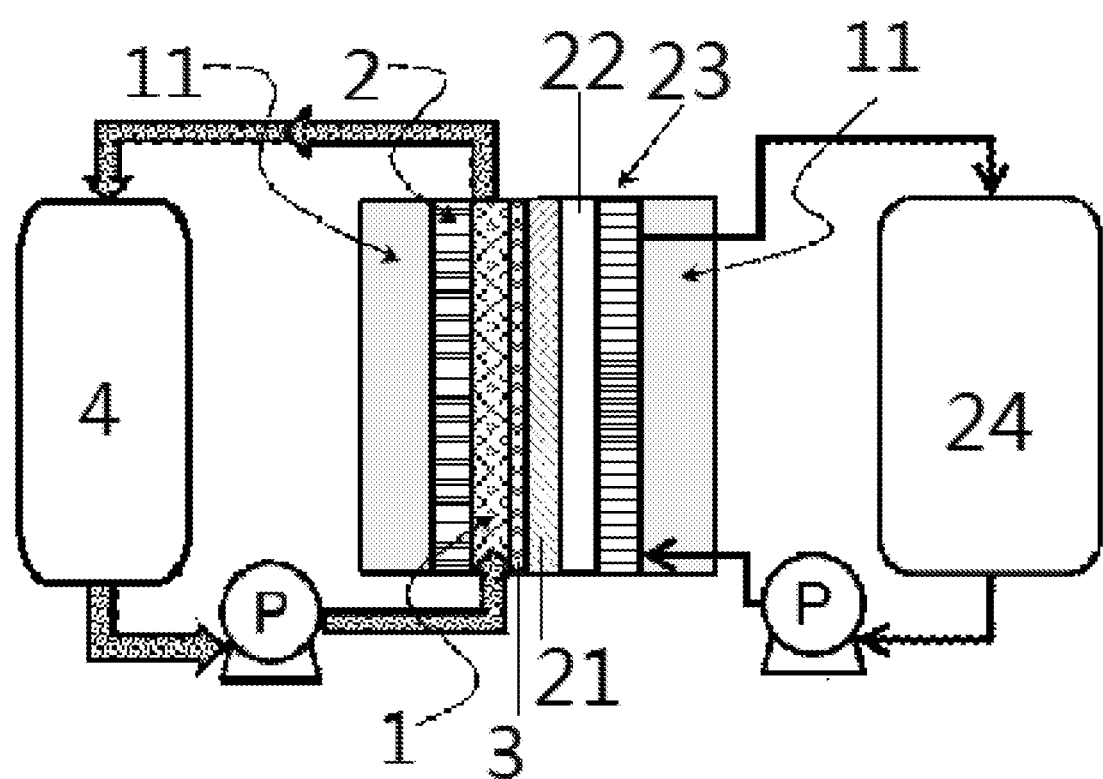
FIG. 4 is a schematic diagram of the flow battery in Example 1.

According to the present invention, the opposite electrode is an electrode provided in the prior art, including stationary porous electrode, and there is no particular restriction on the opposite electrode in the present invention. As shown in FIG. 4, specifically, the opposite electrode comprises: a porous electrode 21, an opposite bipolar plate 22, an opposite current collector 23, and an electrolyte reservoir 24 configured to store opposite electrolyte that contains opposite active substance; the porous electrode 21 is adjacent to the opposite bipolar plate 22; the opposite bipolar plate 22 is adjacent to the opposite current collector 23; the opposite bipolar plate 22 is arranged with electrolyte flow channels, so that the opposite electrolyte is in contact with the porous electrode 21.

On that basis, those skilled in the art should understand: the membrane 3 is put in the middle, the side that has the open slurry electrode cavity 5 of the bipolar plate 1 of the slurry electrode is adjacent to the membrane 3, and the porous electrode 21 of the opposite electrode is adjacent to the other side of the membrane 3. In the direction away from the membrane 3, the opposite electrode is arranged with the porous electrode 21, the opposite bipolar plate 22, and the opposite current collector 23 sequentially.

According to the present invention, the porous electrode 21 may be made of any conventional electrode material commonly used in the flow battery field. Preferably, the material of the porous electrode 21 is at least one of carbon paper, carbon felt, graphite paper, and graphite felt.

According to a preferred embodiment of the present invention, the thickness of the porous electrode 21 is 0.1-10 mm, further preferably is 0.5-5 mm.

In the present invention, the porosity of the porous electrode 21 may be selected within a wide range. For example, the porosity of the porous electrode 21 may be 10-95%, preferably is 50-80%.

According to an embodiment of the present invention, a pump is provided in the connecting pipeline between the outlet of the electrolyte reservoir 24 and the opposite bipolar plate 22.

According to the present invention, the opposite active substance can be any conventional active substances in the art, preferably is at least one of metal halides, metal sulfates, metal hydroxides, vanadic salts in different oxidation states, sodium thiosulfate, and hydrogen bromide.

The metal halides have been described above, and will not be detailed further here.

The metal sulfates may be at least one of copper sulfate, chromic sulfate, titanium sulfate, and zinc sulfate.

The metal hydroxides may be at least one of aluminum hydroxide, ferric hydroxide, chromic hydroxide, and titanium hydroxide, and preferably is titanium hydroxide.

The vanadic salts in different oxidation states may be at least two of $VOSO_4$, $(VO_2)_2SO_4$, $VSO_4$, and $V_2(SO_4)_3$, and preferably are $VOSO_4$ and $(VO_2)_2SO_4$, or are $VSO_4$ and $V_2(SO_4)_3$.

According to a preferred embodiment of the present invention, the opposite active substance is at least one of cupric chloride, vanadium chloride, titanium chloride, zinc chloride, chromium chloride, copper sulfate, chromic sulfate, titanium sulfate, zinc sulfate, titanium hydroxide, sodium thiosulfate, and hydrogen bromide, and further preferably is ferric chloride, or $VOSO_4$ and $(VO_2)_2SO_4$, or $VSO_4$ and $V_2(SO_4)_3$.

According to an embodiment of the present invention, the opposite electrolyte further contains an opposite solvent, which is at least one of water, methanol, ethanol, ether, acetone, and acetic acid, and preferably is water.

According to an embodiment of the present invention, the concentration of the opposite active substance is 0.1-15 mol/L, further preferably is 1-10 mol/L, and optimally is 1-5 mol/L.

According to the present invention, preferably, the opposite electrolyte further contains opposite supporting electrolyte. The opposite supporting electrolyte is at least one of ethylene carbonate, propylene carbonate, diethyl carbonate, dimethyl carbonate, ethyl methyl carbonate, lithium hexafluorophosphate, sulfuric acid, hydrochloric acid, nitric acid, sodium chloride, potassium chloride, sodium sulfate, potassium sulfate, sodium hydroxide, and potassium hydroxide, further preferably is at least one of sulfuric acid, hydrochloric acid, nitric acid, sodium chloride, potassium chloride, sodium sulfate, potassium sulfate, sodium hydroxide, and potassium hydroxide, still further preferably is sulfuric acid and/or sodium chloride.

According to a preferred embodiment of the present invention, the concentration of the opposite supporting electrolyte is 0.1-10 mol/L, further preferably is 1-5 mol/L.

According to the present invention, the opposite electrolyte maybe further contain other additives that can improve the electrochemical performance of the cell, such as conductive additive and surfactant. Preferably, the opposite electrolyte further contains conductive additive and/or surfactant. The conductive additive and surfactant can be any conventional conductive additives and surfactants commonly used in electrolytes in the art respectively.

In the flow battery provided in the present invention, the membrane 3 is put between the slurry electrode and the opposite electrode, and the membrane 3 is adjacent to the bipolar plate 1 of the slurry electrode, and is adjacent to the porous electrode 21 of the opposite electrode.

The membrane 3 can be any conventional membranes in the art, and there is no particular restriction on it in the present invention. The membrane 3 may be the same as or different from the ion exchange membrane 6 in the slurry electrode, as long as it permits the bridge ions between the positive electrode and the negative electrode of the cell to pass through it. Preferably, the membrane 3 is at least one of cation exchange membrane, anion exchange membrane, and sieving membrane; further preferably, the membrane 3 may be made of at least one of sulfonic acid membrane material, high-polymer porous membrane material, organic/inorganic composite material, and inorganic membrane material. The membrane 3 is commercially available.

According to a preferred embodiment of the present invention, the flow battery further comprises end plates 11 mounted at the outer side of the current collectors of the slurry electrode and opposite electrode (the side near the membrane 3 is defined as inner side, and the side away from the membrane 3 is defined as outer side). The end plates 11 are used to fix the flow battery, and the material of the end plates includes, but is not limited to metal materials, metal/high-polymer composite materials, and fiber glass/high-polymer composite materials.

The specific service condition of the flow battery provided in the present invention includes: in the slurry electrode, the electrode slurry is stored in the slurry electrode reservoir 4; when the cell starts to operate, the electrode slurry is circulated between the slurry electrode cavity 5 and the slurry electrode reservoir 4, the open side of the slurry electrode cavity 5 is covered with the ion exchange membrane 6, ions produced in the electrochemical reaction in the electrode slurry can enter into the electrolyte, the ions in the supporting electrolyte pass through the ion exchange membrane 6 and the membrane 3, and the current collector 2 collects the current generated in the electrochemical reaction and transfers the current to the exterior; the electrolyte at the opposite electrode flows through the porous electrode 21 through the electrolyte flow channels arranged on the opposite bipolar plate 22, contacts with the porous electrode 21 and has an electrochemical reaction, and the ions produced in the electrochemical reaction also enter into the electrolyte, the ions in the supporting electrolyte can pass through the membrane 3, and the opposite current collector 23 collects the current generated in the electrochemical reaction and transfers the current to the exterior.

Figure 5:
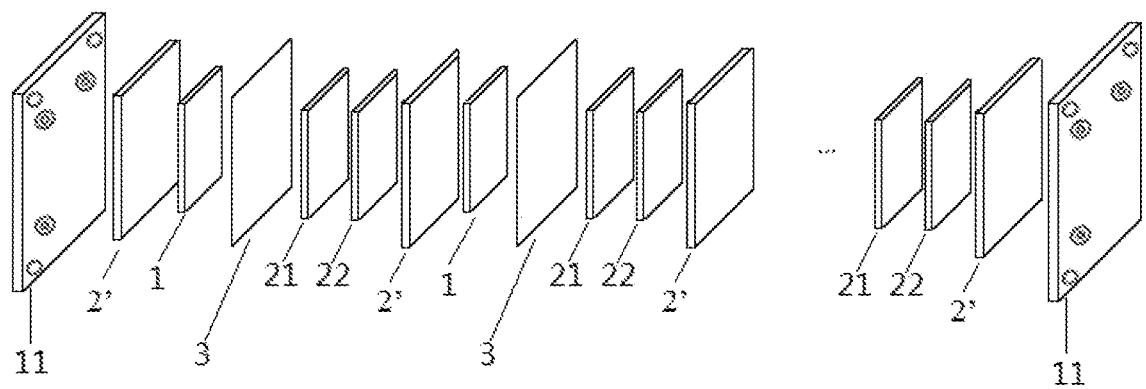
FIG. 5 is a schematic diagram of a stack.

The present invention further provides a stack, which comprises the flow battery described above. Those skilled in the art can configure the stack to include two or more flow batteries connected in series according to the actual requirement. In a case that two unit cells are connected in series, the opposite current collector 23 of the first unit cell is adjacent to the current collector 2 of the second unit cell; in that case, one of the current collectors may be omitted, because the opposite current collector 23 and the current collector 2 essentially attain the same function. In the present inventions, different reference symbols and reference numbers are used only for the purpose of differentiating the current collectors of different units (slurry electrode and opposite electrode). FIG. 5 is an exploded view of the stack provided in the present invention. In FIG. 5, the opposite current collector 23 and the current collector 2 are generally referred to as stack current collector 2'. The 3 unit cells connected in series are shown exemplarily in FIG. 5. Based on the above teaching or the actual requirements, those skilled in the art may add more unit cells in the area omitted in the figure. The stack described in the present invention is equipped with one, two or more slurry electrode reservoirs 4 and one, two or more electrolyte reservoirs 24. The slurry electrode reservoir 4 supplies electrode slurry to the slurry electrode, and the electrolyte reservoir 24 supplies electrode slurry to the opposite electrode.

Hereunder, the present invention will be further detailed in examples.

Example 1

(1) The Composition of the Electrode Slurry is Shown in Table 1, and the Composition of the Opposite Electrolyte is Shown in Table 2.

(2) Flow Battery

The slurry electrode is shown in FIG. 1. The electrode slurry is stored in a slurry electrode reservoir 4, the bipolar plate 1 (300 mm×300 mm×5 mm) has a slurry electrode cavity 5 that is open on one side (200 mm×200 mm×2 mm (depth H)), serpentine-shaped fluid channel 9 (grooves machined in the bipolar plate 1, in 0.2 mm depth and 2 mm width, as shown in FIG. 3) and 4 baffle plates 10 (as shown in FIG. 2) are arranged in the slurry electrode cavity 5, wherein, two baffle plates are parallel to each other, with one end in contact with the top end face of the slurry electrode cavity 5; the other two baffle plates are parallel to each other, with one end in contact with the bottom end face of the slurry electrode cavity 5; the angle α is 45°; the baffle plates 10 have a rectangular cross section (1 mm×1.5 mm) and are in 20 mm length. An electrode slurry inlet flow channel 7 and an electrode slurry outlet flow channel 8 are arranged and extended between the bipolar plate 1 and the slurry electrode cavity 5, the electrode slurry inlet flow channel 7 is connected with the outlet of the slurry electrode reservoir 4 through a pipeline, and a pump is provided in the pipeline, the electrode slurry outlet flow channel 8 is connected with the inlet of the slurry electrode reservoir 4, so that the electrode slurry can be circulated between the slurry electrode cavity 5 and the slurry electrode reservoir 4. The electrode slurry inlet flow channel 7 and the electrode slurry outlet flow channel 8 have a circular cross section in 0.5 mm diameter respectively. The electrode slurry inlet flow channel 7 and the electrode slurry outlet flow channel 8 are inclined to the side of the slurry electrode reservoir 4, and the angle between the extension direction of the electrode slurry inlet flow channel 7/electrode slurry outlet flow channel 8 and the horizontal direction is 60°. The open side of the slurry electrode cavity 5 is covered with an ion exchange membrane 6 (hydrogen ion exchange membrane), and a current collector 2 (made of graphite material) is arranged on the side of the bipolar plate 1 opposite to the open side of the slurry electrode cavity 5.

The structure of the opposite electrode is shown in FIG. 4. The opposite electrode comprises: a porous electrode 21 (made of a porous carbon fiber felt, from SGL Group, designation: KFD2.5EA, dimensions: 200 mm×200 mm×2.5 mm), an opposite bipolar plate 22 (200 mm×200 mm×1 mm), an opposite current collector 23 (200 mm×200 mm×1 mm, made of graphite material), and an electrolyte reservoir 24 configured to store opposite electrolyte that contains opposite active substance; the porous electrode 21 is adjacent to the opposite bipolar plate 22; the opposite bipolar plate 22 is adjacent to the opposite current collector 23, and the opposite bipolar plate 22 is arranged with electrolyte flow channels, so that the opposite electrolyte is in contact with the porous electrode 21. A membrane 3 (perfluorosulfonic acid membrane, from Chemours Chemical, designation: Nafion117) is put between the opposite electrode and the slurry electrode. End plates 11 are provided at the outermost side of the current collectors of the opposite electrode and slurry electrode, and the above-mentioned components are fastened with bolts through preformed holes to assemble the components into a flow battery.

Figure 6:
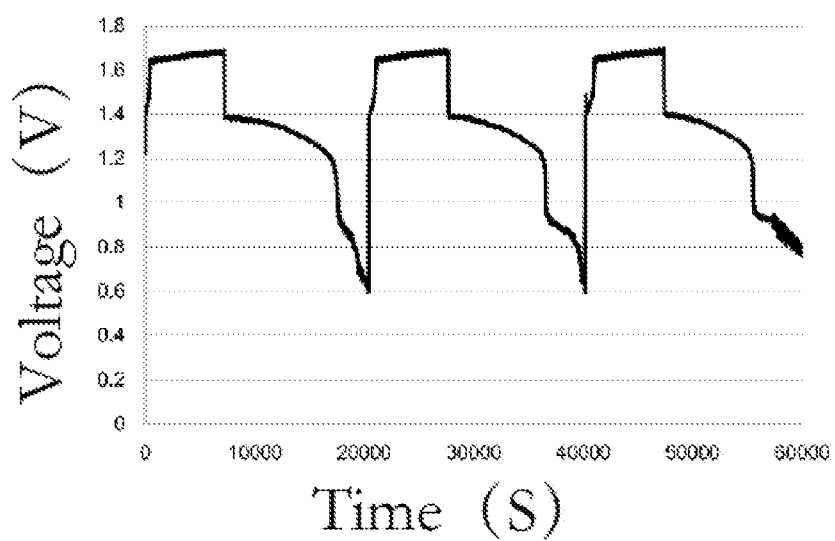
FIG. 6 shows the curve of the flow battery in Example 1 in a charge-discharge test process.
Figure 7:
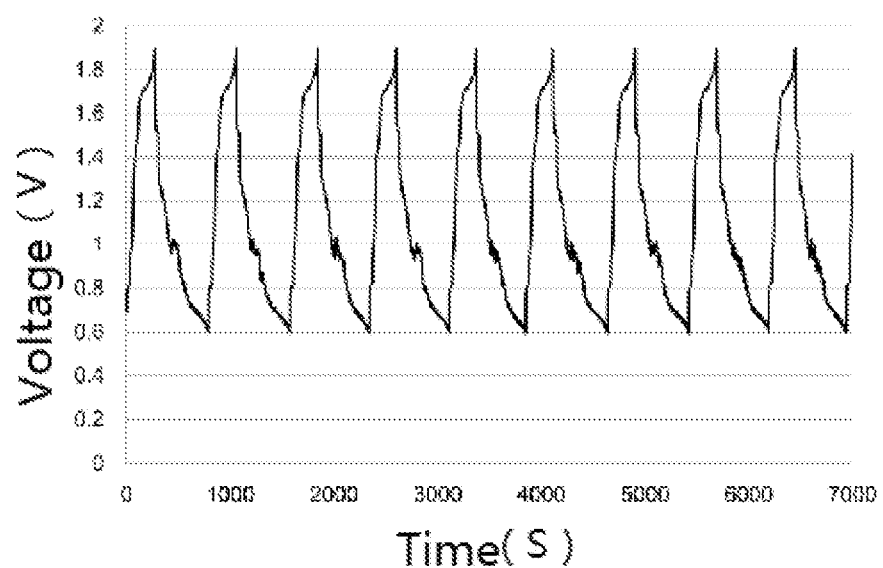
FIG. 7 shows the curve of the flow battery in Example 1 in a charge-discharge test process when the transport of the electrode slurry is stopped.

A charge-discharge test (at 100 mA/cm² current density) is used for the assembled flow battery. As show in FIG. 6, the plateau of voltage in the charging process of the cell is 1.6V-1.7V, the plateau of voltage in the discharging process of the cell is 1.4V-1.2V, and the open circuit voltage of the cell is 1.5V. The plateau of voltage of the cell in the charging/discharging process lasts for 16 h, exhibiting the typical charging-discharging characteristics of a flow battery. A charge-discharge test (at 100 mA/cm²) is used for the cell after stopping the transport of the electrode slurry. As shown in FIG. 7, no plateau of voltage is formed, no typical plateau occurs in the working curve of the cell, and the performance of the cell is similar to that of a cell that has no power-capacity decoupled function (e.g., an Li-ion cell), without the characteristic of a flow battery. The main reason is: since the electrode slurry in the slurry electrode reservoir can't flow into the slurry electrode cavity after the pumping is stopped, only the residual active substance in the slurry electrode cavity participates in the reaction, the capacity of cell is reduced, and the charge-discharge cycle only lasts for a few minutes; besides, the voltage is increased or decreased continuously, since there is no replenished active substance in the continuous charging or discharging process.

Example 2

A flow battery is assembled according to the Example 1, but the composition of the electrode slurry is different. Please see Table 1 for more information.

A charge-discharge test is used for the assembled flow battery. The flow battery exhibits the typical charging-discharging characteristics of a flow battery in the test.

Example 3

A flow battery is assembled according to the Example 1, but the composition of the electrode slurry is different. Please see Table 1 for more information.

A charge-discharge test is used for the assembled flow battery. The flow battery exhibits the typical charging-discharging characteristics of a flow battery in the test.

Example 4

A cell is assembled according to Example 1, but the active substance $AlCl_3$ in the electrode slurry is replaced with $CoCl_2$ in the same molar mass. A charge-discharge test is used for the assembled flow battery. The flow battery exhibits the typical charging-discharging characteristics of a flow battery in the test.

Example 5

A cell is assembled according to the Example 1, but the graphite electrode particles in the electrode slurry are replaced with molybdenum disulfide particles in the same mass and the same average particle diameter. A charge-discharge test is used for the assembled flow battery. The flow battery exhibits the typical charging-discharging characteristics of a flow battery in the test.

Example 6

A cell is assembled according to the Example 1, but the quantity of graphite is 600 pbw based on 100 pbw active substance in the electrode slurry. A charge-discharge test is used for the assembled flow battery. The flow battery exhibits the typical charging-discharging characteristics of a flow battery in the test.

TABLE 1

| | Electrolyte (the solvent is water) | | | | | |
|---|---|---|---|---|---|---|
| | Active substance | | Supporting electrolyte | | Electrode particles | | |
| | Species | Concentration, mol/L | Species | Concentration, mol/L | Species | Average particle diameter, μm | Dose, pbw |
| Example 1 | $AlCl_3$ | 5 | $H_2SO_4$ | 1 | Graphite | 50 | 200 |
| | | | NaCl | 1 | | | |
| Example 2 | $FeCl_3$ | 3 | NaCl | 5 | Graphite | 60 | 300 |
| Example 3 | $FeCl_3$ | 1 | NaCl | 5 | Graphite | 100 | 500 |

Note:
the ratio of the electrode particles refers to the quantity of the electrode particles based on 100 pbw active substance.

TABLE 2

| | Opposite electrolyte (the solvent is water) | | | |
|---|---|---|---|---|
| | Opposite active substance | | Opposite supporting electrolyte | |
| | Species | Concentration, mol/L | Species | Concentration, mol/L |
| Example 1 | $VOSO_4$ | 0.8 | $H_2SO_4$ | 3 |
| | $V_2(SO_4)_3$ | 0.8 | | |
| Example 2 | $VSO_4$ | 0.8 | $H_2SO_4$ | 3 |
| | $V_2(SO_4)_3$ | 0.8 | | |
| Example 3 | $FeCl_3$ | 1 | NaCl | 5 |

Example 7

A cell is assembled according to the Example 1, but no baffle plate 10 is provided in the slurry electrode cavity 5. A charge-discharge test is used for the assembled flow battery. The flow battery exhibits the typical charging/discharging characteristics of a flow battery in the test.

Example 8

A cell is assembled according to the Example 1, but the electrode slurry inlet flow channel 7 and the electrode slurry outlet flow channel 8 are arranged vertically, i.e., the angle between the extension direction of the electrode slurry inlet flow channel 7/electrode slurry outlet flow channel 8 and the horizontal direction is 90° respectively. A charge-discharge test is used for the assembled flow battery. The flow battery exhibits the typical charging-discharging characteristics of a flow battery in the test, but the data involves severe local fluctuations.

Example 9

A cell is assembled according to Example 1, but the active substance $AlCl_3$ in the electrode slurry is replaced with $AlBr_3$ in the same molar mass. A charge-discharge test is used for the assembled flow battery. The flow battery exhibits the typical charging-discharging characteristics of a flow battery in the test.

Comparative Example 1

Porous carbon fiber felt in 2 mm thickness is used as the positive electrode and the negative electrode of the cell, the electrode dimensions are 200 mm×200 mm, and the positive electrode and the negative electrode are placed into a fluid frame respectively, which has 200 mm×200 mm inside dimensions and is in thickness of 2 mm, and has an electrolyte inlet on its top part and an electrolyte outlet on its bottom part. A mixture of 0.8 mol/L $VOSO_4$+0.8 mol/L $(VO_2)_2SO_4$+3 mol/L $H_2SO_4$ is used as the positive electrode electrolyte, a mixture of 0.8 mol/L $VSO_4$+0.8 mol/L $V_2(SO_4)_3$+3 mol/L $H_2SO_4$ is used as the negative electrode electrolyte, a perfluorosulfonic acid membrane is arranged between the positive electrode and the negative electrode, graphite composite plates (from SGL Group, designation: SGL-50) are provided at the outer side of the fluid frames to collect currents, end plates are provided at the outer side of the graphite composite plates, and the above-mentioned components are fastened with bolts through preformed holes to assemble the components into a flow battery.

Test Example

Cyclic charge-discharge tests are carried out at 100 $mA/cm^2$ current density for the flow batteries assembled in the examples 1-9 and the comparative example 1. The test results of specific discharge capacity in the first discharging cycle and the specific discharge capacity after 50 discharging cycles are shown in Table 3.

TABLE 3

|  | Specific discharge capacity in the first discharging cycle (mAh/g) | Specific discharge capacity after 50 discharging cycles (mAh/g) |
| --- | --- | --- |
| Example 1 | 66.7 | 66.5 |
| Example 2 | 65.8 | 65.5 |
| Example 3 | 64.2 | 64.1 |
| Example 4 | 40.4 | 40.1 |
| Example 5 | 48.2 | 48.1 |
| Example 6 | 55.7 | 55.3 |
| Example 7 | 54.4 | 54.1 |
| Example 8 | 57.7 | 57.3 |
| Example 9 | 60.2 | 58.5 |
| Comparative Example 1 | 30.2 | 29.8 |

It can be seen from the data in Table 3: under the same current condition, the flow battery provided in the present invention has higher specific discharge capacity in the first discharging cycle, and still has higher specific discharge capacity after 50 discharging cycles. The results indicate that the flow battery provided in the present invention has better cycle performance. Besides, compared with conventional flow batteries, which employ expensive carbon fibers, the flow battery provided in the present invention can employ granular electrode material for the electrode slurry. Hence, the electrode material preparation process is simpler, both the material cost and the synthesis cost are lower, and thereby the production cost of the flow battery is lower.

While the present invention is described above in detailed in the preferred embodiments with reference to the accompanying drawings, the present invention is not limited to those embodiments. Different simple variations can be made to the technical scheme of the present invention within the scope of the technical concept of the present invention, including combining the specific technical features in any proper way. Various possible combinations are not described in the present invention, in order to avoid unnecessary repetitive description. However, such simple variations and combinations shall also be deemed as having been disclosed and falling in the scope of protection of the present invention.

What is claimed is:

1. An electrode slurry, comprising electrode particles and electrolyte that contains active substance, wherein based on 100 pbw active substance, the electrode particles are 200-500 pbw;
   wherein the average particle diameter of the electrode particles is 0.01-200 μm, and the active substance comprises at least one of aluminum chloride, aluminum bromide, titanium chloride, cupric chloride, nickel chloride, cobaltous chloride, and zinc chloride;
   the electrolyte further contains supporting electrolyte, which is at least one of ethylene carbonate, propylene carbonate, diethyl carbonate, dimethyl carbonate, ethyl methyl carbonate, lithium hexafluorophosphate, sulfuric acid, hydrochloric acid, nitric acid, sodium chloride, potassium chloride, sodium sulfate, potassium sulfate, sodium hydroxide, and potassium hydroxide.

2. The electrode slurry according to claim 1, wherein in the electrolyte, the concentration of the active substance is 0.1-15 mol/L;
   the electrolyte further contains solvent, which is at least one of water, methanol, ethanol, ether, acetone, and acetic acid.

3. The electrode slurry according to claim 1, wherein the concentration of the supporting electrolyte is 0.1-10 mol/L.

4. The electrode slurry according to claim 1, wherein the electrode particles are at least one of graphite, carbon powder, silicon, and molybdenum disulfide.

5. The electrode slurry according to claim 4, wherein the electrode particles are graphite;
   the average particle diameter of the electrode particles is 1-100 μm.

6. A slurry electrode, comprising:
   A bipolar plate, a current collector, and a slurry electrode reservoir configured to store electrode slurry; wherein,
   with regard to the two opposite sides of the bipolar plate, one side is adjacent to the current collector, and the other side is arranged with a slurry electrode cavity that is open on one side, and the open side of the slurry electrode cavity is covered with an ion exchange membrane;
   an electrode slurry inlet flow channel and an electrode slurry outlet flow channel are arranged and extended between the bipolar plate and the slurry electrode cavity, the electrode slurry inlet flow channel is connected with an outlet of the slurry electrode reservoir, and the electrode slurry outlet flow channel is connected with an inlet of the slurry electrode reservoir, so that the electrode slurry is circulated between the slurry electrode cavity and the slurry electrode reservoir;

the electrode slurry is the electrode slurry recited in claim 1.

7. The slurry electrode according to claim 6, wherein the depth H of the slurry electrode cavity is 0.1-10 mm;

the volume of the slurry electrode cavity is 5-90% of the volume of the bipolar plate.

8. The slurry electrode according to claim 6, wherein the depth H of the slurry electrode cavity is 0.5-5 mm;

the volume of the slurry electrode cavity is 10-50% of the volume of the bipolar plate.

9. The slurry electrode according to claim 6, wherein the slurry electrode cavity is arranged with fluid channel, which is serpentine-shaped flow channel, interdigitated flow channel, or parallel flow channels.

10. The slurry electrode according to claim 6, wherein the slurry electrode cavity is arranged with at least one baffle plate, and if two or more baffle plates, they are spaced from each other.

11. The slurry electrode according to claim 6, wherein angle between the extension direction of the electrode slurry inlet flow channel and the horizontal direction is 0°-90°; and angle between the extension direction of the electrode slurry outlet flow channel and the horizontal direction is 0°-90°.

12. The slurry electrode according to claim 6, wherein angle between the extension direction of the electrode slurry inlet flow channel and the horizontal direction is 45°-90°; and angle between the extension direction of the electrode slurry outlet flow channel and the horizontal direction is 45°-90°.

13. A flow battery, comprising a slurry electrode, an opposite electrode, and a membrane put between the slurry electrode and the opposite electrode, wherein the slurry electrode is the slurry electrode recited in any of claims 6.

14. The flow battery according to the claim 13, wherein the opposite electrode comprises a porous electrode, an opposite bipolar plate, an opposite current collector, and an electrolyte reservoir configured to store opposite electrolyte that contains opposite active substance;

the porous electrode is adjacent to the opposite bipolar plate, and the opposite bipolar plate is adjacent to the opposite current collector; and the opposite bipolar plate is arranged with electrolyte flow channels, so that the opposite electrolyte is in contact with the porous electrode.

15. A stack, comprising the flow battery recited in the claim 13.

* * * * *